US008359598B2

(12) United States Patent
Diwakar et al.

(10) Patent No.: US 8,359,598 B2
(45) Date of Patent: Jan. 22, 2013

(54) ENERGY EFFICIENT SCHEDULING SYSTEM AND METHOD

(75) Inventors: Kiran Prakash Diwakar, Pune (IN); Rahul Golash, Hyderabad (IN); Stephen B. Boston, New Milford, CT (US)

(73) Assignee: CA, Inc., Islandia, NY (US)

( * ) Notice: Subject to any disclaimer, the term of this patent is extended or adjusted under 35 U.S.C. 154(b) by 357 days.

(21) Appl. No.: 12/752,226

(22) Filed: Apr. 1, 2010

(65) Prior Publication Data
US 2011/0246987 A1   Oct. 6, 2011

(51) Int. Cl.
*G06F 9/46* (2006.01)
(52) U.S. Cl. .................. 718/102; 713/300; 713/320
(58) Field of Classification Search .................. None
See application file for complete search history.

(56) References Cited

U.S. PATENT DOCUMENTS

| | | | |
|---|---|---|---|
| 7,742,830 B1 * | 6/2010 | Botes | 700/32 |
| 2008/0209234 A1 * | 8/2008 | Clidaras et al. | 713/300 |
| 2010/0087963 A1 | 4/2010 | Boston et al. | 700/295 |
| 2010/0115082 A1 | 5/2010 | Pirozzi | 709/224 |
| 2010/0235654 A1 * | 9/2010 | Malik et al. | 713/300 |
| 2010/0235840 A1 * | 9/2010 | Angaluri | 718/102 |
| 2010/0241881 A1 * | 9/2010 | Barsness et al. | 713/320 |
| 2011/0185063 A1 * | 7/2011 | Head et al. | 709/226 |

OTHER PUBLICATIONS

Pending U.S. Appl. No. 12/697,528 entitled *System and Method for Datacenter Power Management* in the name of Milan Pavel, et al.; 33 total pages, filed Feb. 1, 2010.

\* cited by examiner

*Primary Examiner* — Emerson Puente
*Assistant Examiner* — Dong Kim
(74) *Attorney, Agent, or Firm* — Baker Botts L.L.P.

(57) ABSTRACT

An energy efficient scheduling system and method is disclosed. In some embodiments, a method includes receiving, with a processor, a request for execution of an application. The method also includes receiving, based on the request, a scheduling policy. Additionally, the method includes for each of a plurality of datacenters, determining one or more datacenter attributes associated with each respective datacenter. The method also includes selecting one of the plurality of datacenters to execute the application based, at least in part, on the request, the scheduling policy, and the datacenter attributes and executing the application at the selected datacenter.

22 Claims, 2 Drawing Sheets

ENERGY EFFICIENT SCHEDULING SYSTEM AND METHOD

TECHNICAL FIELD OF THE INVENTION

The present disclosure relates generally to application scheduling, and more particularly to an energy efficient scheduling system and method.

BACKGROUND OF THE INVENTION

Many industries are moving towards a status-quo in relation to energy savings, both for environmental safeguards as well as for financial betterment. Saving energy is not only a corporate social responsibility for enterprises, but also a business need. Corporations have become all the more sensitive towards energy savings both for Data Centers as well as the overall building spaces. This is one aspect where enterprises can be become more energy efficient on the business front as energy costs account for a non-negligible percentage of the company's spending. Most big enterprises have large datacenters/computational capabilities across the globe where energy-saving opportunities are not realized.

SUMMARY OF THE INVENTION

In accordance with the present disclosure, the disadvantages and problems associated with prior systems and methods for energy efficient scheduling systems and methods have been substantially reduced or eliminated.

In accordance with a particular embodiment of the present disclosure, a method includes receiving, with a processor, a request for execution of an application. The method also includes receiving, based on the request, a scheduling policy. Additionally, the method includes for each of a plurality of datacenters, determining one or more datacenter attributes associated with each respective datacenter. The method also includes selecting one of the plurality of datacenters to execute the application based, at least in part, on the request, the scheduling policy, and the datacenter attributes and executing the application at the selected datacenter.

In accordance with another embodiment of the present disclosure, a system includes a plurality of datacenters, wherein each of the respective datacenter is associated with one or more datacenter attributes. The system also includes a scheduling server operable to receive a request for execution of an application. The scheduling server is also operable to receive, based on the request, a scheduling policy and select one of the plurality of datacenters to execute the application based, at least in part, on the request, the scheduling policy, and the datacenter attributes. The system also includes a policy server operable to transmit the scheduling policy to the scheduling server. Additionally, the system includes a server located at the selected datacenter, wherein the server is operable to execute the application.

In accordance with yet another embodiment of the present disclosure, a computer readable non-transitory medium is encoded with logic, and the logic is operable, when executed on a processor, to receive a request for execution of an application. The logic is further operable to receive, based on the request, a scheduling policy. The logic is also operable to, for each of a plurality of datacenters, determine one or more datacenter attributes associated with each respective datacenter. Additionally, the logic is operable to select one of the plurality of datacenters to execute the application based, at least in part, on the request, the scheduling policy, and the datacenter attributes and execute the application at the selected datacenter.

Technical advantages of particular embodiments of the present disclosure include providing numerous opportunities for energy cost savings and enhancing an enterprise's use of renewable sources. As a result, particular embodiments allow companies to significantly reduce energy costs and/or reduce the carbon footprint associated with processing computing jobs. Utilizing embodiments of the present disclosure, enterprises may gain control of resource utilization, and direct application execution according to predefined policies. Predetermined and configurable policies allow an enterprise to control their energy usage, weighting such factors as time, carbon footprint, corporate image, cost, profit and revenue generating opportunities, performance, and scalability. Enterprises may change the weights associated with each policy, thus enabling an enterprise to change energy consumption and carbon usage patterns over time.

Other technical advantages of the present disclosure will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE INVENTION

Figure 1:
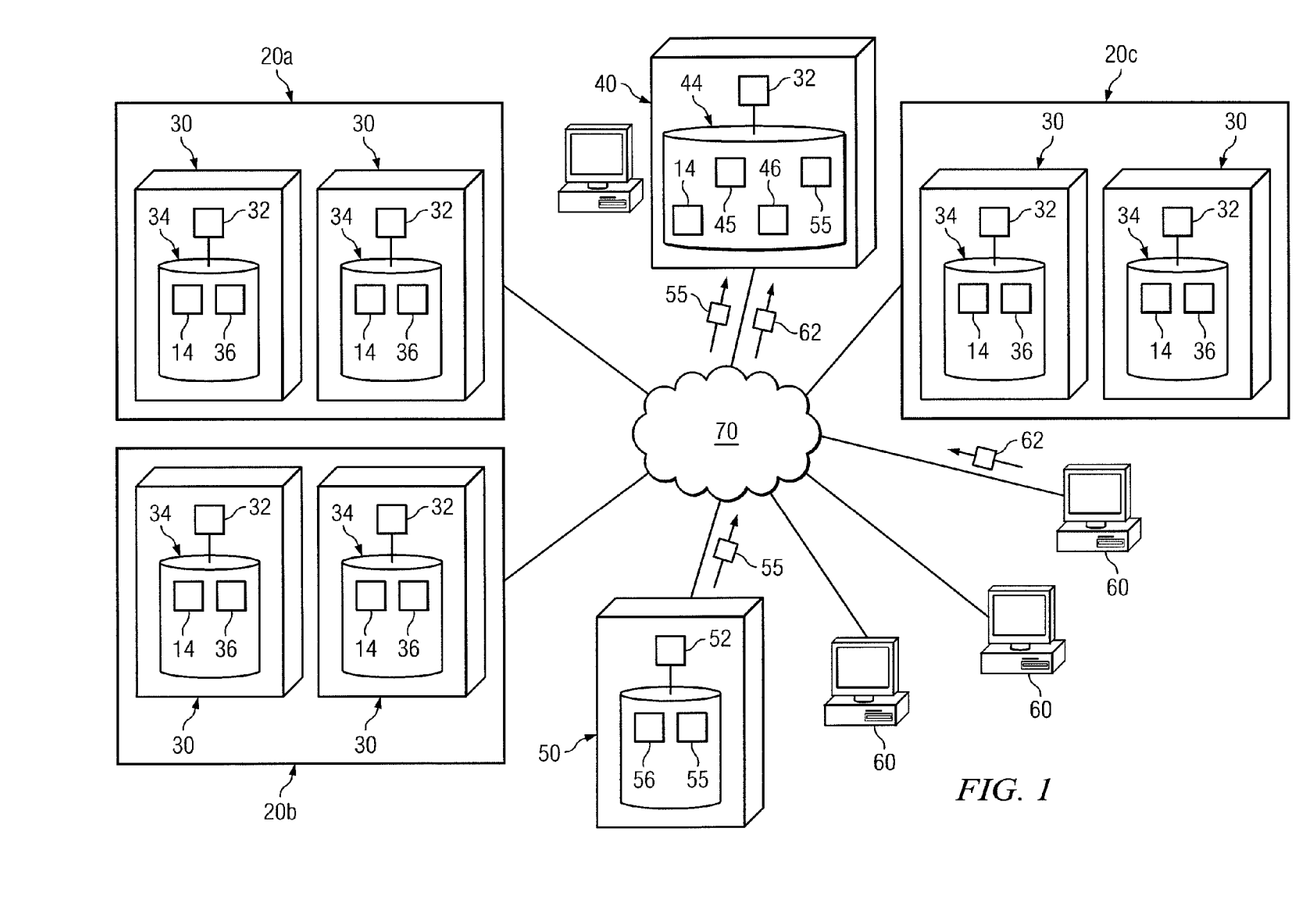
FIG. 1 illustrates a system in accordance with particular embodiments of the present disclosure, including a scheduling server, a policy server, datacenters, servers, clients, and a network.

FIG. 1 illustrates a system 10 in accordance with embodiments of the present disclosure. System 10 comprises datacenters 20, servers 30, scheduling server 40, policy server 50, clients 60, and network 70. System 10 is generally operable to optimally schedule the execution of applications at a particular datacenter 20 to provide the most energy efficient application execution, according to predetermined policies. To optimally schedule the execution of applications, policy server 50 stores scheduling policy 55 that scheduling server 40 uses to schedule and/or execute applications. Scheduling server 40 may determine one or more datacenter attributes 45. Based, at least in part, on a request 62 from client 62, datacenter attributes 45 and scheduling policy 55, scheduling server 40 determines an appropriate datacenter 20 to execute an application. Scheduling server 40 may then schedule execution of the application at the selected datacenter 20.

Datacenters 20a, 20b, and 20c (which may be referred to individually as "datacenter 20" or collectively as "datacenters 20") are facilities that each house a collection of servers, computers, networking equipment, data storage systems, security devices, power supplies and/or any other appropriate hardware, software and/or other equipment suitable to facilitate the execution applications 14. In some embodiments datacenter 20 represents a processing site at which applications 14 are executed. As shown in FIG. 1, datacenters 20 may be geographically dispersed. In some embodiments, datacenter 20 may be geographically clustered. In particular embodiments, datacenter 20 houses server 30, scheduling server 40, and/or policy server 50, each of which may execute application 14 requested by client 60. To provide electricity to datacenter 20 and the components therein, datacenter 20 is connected to an electrical power provider. The electrical power provider may charge different rates to datacenter 20 during different times of the day. For example, a price charged for electricity may be more expensive during peak-demand times of the day, and less expensive during off-peak times. The price charged may be measured as a rate. For example, the price of electricity may be measured in dollars per kilowatt-hours. Thus, the peak-demand price, for example, may be $0.25 per kilowatt-hours, and the off-peak price may be $0.15 per kilowatt hours. In some embodiments, the price of electricity charged to datacenter 20 fluctuates dynamically during the day in response to electricity demand.

Servers 30 are housed in datacenters 20 and execute applications 14 requested by clients 60. Servers 30 may also include one or more computer input devices, such as a keyboard, trackball, or a mouse, and/or one or more Graphical User Interfaces (GUIs), through which a user may interact with the logic executing on processor 32. In general, however, server 30 may include any appropriate combination of hardware, software, and/or encoded logic suitable to perform the described functionality. In some embodiments, server 30 may comprise a general-purpose personal computer (PC), a Macintosh, a workstation, a Unix-based computer, a server computer, or any suitable processing device. The functions and operations described above may be performed by a pool of servers 30. A server 30 may comprise memory 34 and processor 32.

Memory 34 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information. Although FIG. 1 illustrates memory 34 as internal to server 30, it should be understood that memory 34 may be internal or external to server 30, depending on particular implementations. Memory 34 may be separate from or integral to other memory devices to achieve any suitable arrangement of memory devices for use in system 10.

Memory 34 stores applications 14 and data associated with applications 14. In some embodiments, memory 34 stores an amount of watts consumed by processor 32 for a predetermined unit of time. The amount of watts consumed by processor 32 may be measured as watts per Central Processing Unit (CPU) cycle. Memory 34 may also store an amount of CPU cycles a particular application 14 utilizes during execution. Memory 34 also stores logic 36. Logic 36 generally comprises rules, algorithms, code, tables, and/or other suitable instructions for executing applications 14 and storing and/or generating data associated with applications 14.

Memory 34 is communicatively coupled to processor 32. Processor 32 is generally operable to execute logic 36 to execute applications 14 requested by clients 60, and/or determine a utilization of server 30. Processor 32 comprises any suitable combination of hardware and software implemented in one or more modules to provide the described function or operation.

Scheduling server 40 selects an appropriate datacenter 20 from among a plurality of datacenters 20 to execute a requested application 14 based, at least in part, on scheduling policy 55, request 62, and/or datacenter attributes 45. Scheduling server 40 may receive scheduling policy 55 from policy server 50. Datacenter attributes 45 indicate one or more characteristics, aspects, and/or variables associated with one or more datacenters. In particular embodiments, datacenter attributes 45 indicates one or more of: (1) the percentage utilization of servers 30 in a respective datacenter 20; (2) the overall utilization of the particular datacenter 20; (3) a cooling/heating index of a particular datacenter 20; (4) power availability; (5) the optimal usage of renewable energy for operations as well as heating and/or cooling of datacenter 20; (6) power unit price profiling based on the local regulations or provider; (7) peak pricing and off-peak pricing information; (8) historical and/or real time climatic factors of the area supporting energy usage; (9) energy supply availability for a specific time and duration based on local constraints and demand. Datacenter attributes 45 may represent information stored in an electronic file in memory 44, information stored in a relational database stored in memory 44, and/or information stored in any suitable manner. In particular embodiments, scheduling server 40 receives datacenter attributes 45 from user input, from servers 30 located in datacenter 20, and/or from any other suitable component of system 10. Based on scheduling policy 55, request 62, and/or datacenter attributes 45, scheduling server 40 may select an appropriate datacenter 20 at which client 60 should execute a requested application 14, and may instruct client 60 to execute a requested application 14 at the selected datacenter 20. In particular embodiments, scheduling server 40 may execute a requested application 14 at the selected datacenter 20, and transmit a display, print-out, data, information, audio, video, and/or any other suitable results of executing application 14. In some embodiments, scheduling server 40 comprises a general-purpose personal computer (PC), a Macintosh, a workstation, a Unix-based computer, a server computer, or any suitable processing device. The functions and operations described above may be performed by a pool of scheduling servers 40.

Policy server 50 stores scheduling policy 55 and transmits scheduling policy 55 to scheduling server 40. In particular embodiments, policy server 50 may store one or more scheduling policies 55, depending on the overall needs, capabilities, and/or configuration of system 10. Scheduling server 40 may utilize a particular scheduling policy 55 based on the particular application 14 being executed, the particular datacenter 20 application 14 will be executed at, the time of day requested, the particular user requesting execution of application 14, and/or any other relevant considerations, factors, and/or variables. In general scheduling policy 55 indicates one or more constraints, rules, procedures, and/or any other suitable policies that scheduling server 40 uses to facilitate the selection of a particular datacenter 20 and the execution of application 14. In some embodiments, policy server 50 includes a user interface to a software application running on policy server 50 that enables a user to create scheduling policy 55 for the energy efficient execution of applications 14 in system 10. A user interface may include one or more user input devices such as a keyboard, trackball, or a mouse, and/or one or more Graphical User Interfaces. In some embodiments, policy server 50 comprises a general-purpose personal computer (PC), a Macintosh, a workstation, a Unix-based computer, a server computer, or any suitable processing device. The functions and operations described above may be performed by a pool of policy servers 50.

Memory 54 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information, including scheduling policy 55. Although FIG. 1 illustrates memory 54 as internal to policy server 50, it should be understood that memory 54 may be internal or external to policy server 50, depending on particular implementations. Memory 54 may be separate from or integral to other memory devices to achieve any suitable arrangement of memory devices for use in system 10. Memory 54 stores logic 56. Logic 56 generally comprises rules, algorithms, code, tables, and/or other suitable instructions for storing and/or scheduling policy 55.

Memory 54 is communicatively coupled to processor 52. Processor 52 is generally operable to execute logic 56 to generate, receive and/or transmit scheduling policy 55. Processor 52 comprises any suitable combination of hardware and software implemented in one or more modules to provide the described function or operation.

Clients 60 (each of which may be referred to individually as "client 60" or collectively as "clients 60") may transmit request 62 to scheduling server 40 to execute application 14. Request 62 represents any form of data transmission, including information transmitted in an Internet Protocol packet, Ethernet frame, Asynchronous Transfer Mode cell, Frame Relay frame, and/or any other suitable mode of data communication. In some embodiments, application 14 represents any suitable software and/or logic executable on server 30. Application 14 represents, for example, a word processing program, a data backup job, data storage, a database management system, an email program, an interne browser, logistics management, a client relations management program, and/or batch processing data. In particular embodiments, clients 60, transmit request 62 to scheduling server 40 as part of executing application 14 itself. In particular embodiments, clients 60 represent general or special-purpose computers operating software applications capable of performing the above-described operations. For example, clients 60 may include, but are not limited to, laptop computers, desktop computers, portable data assistants (PDAs), and/or portable media players. In some embodiments, client 60 comprises general-purpose personal computer (PC), a Macintosh, a workstation, a Unix-based computer, a server computer, or any suitable processing device. Additionally, in particular embodiments, client 60 may include one or more processors operable to execute computer logic and/or software encoded on tangible media that performs the described functionality. Client 60 may also include one or more computer input devices, such as a keyboard, trackball, or a mouse, and/or one or more Graphical User Interfaces (GUIs), through which a user may interact with the logic executing on the processor of client 60. In general, however, client 60 may include any appropriate combination of hardware, software, and/or encoded logic suitable to perform the described functionality. Additionally, clients 60 may be connected to or communicate with scheduling server 40 and/or datacenters 20 directly or indirectly over network 70. Clients 60 may couple to network 70 through a dedicated wired or wireless connection, or may connect to network 70 only as needed to receive, transmit, or otherwise execute applications. Although FIG. 1 illustrates, for purposes of example, a particular number and type of clients 60, alternative embodiments of system 10 may include any appropriate number and type of clients 60, depending on the size of a particular enterprise.

Network 70 represents any number and combination of wireline and/or wireless networks suitable for data transmission. Datacenters 20, server 30, scheduling server 40, policy server 50, and clients 60 are communicatively coupled via one or more networks 70. In particular embodiments, clients 60 may communicatively couple to datacenters 20 and/or scheduling server 40 via network 70. Network 70 may, for example, communicate internet protocol packets, frame relay frames, asynchronous transfer mode cells, and/or other suitable information between network addresses. Network 70 may include one or more intranets, local area networks, metropolitan area networks, wide area networks, cellular networks, all or a portion of the Internet, and/or any other communication system or systems at one or more locations.

In operation, client 60 transmits request 62 to scheduling server 40 to execute application 14. Request 12 may be transmitted over network 70, and may include information indicating the type of requested application 14, an amount of memory and/or CPU processing power required by the requested application, an amount of data that will be used during the execution the application 14, a preferred and/or mandatory time at which requested application 14 should be processed, and/or any other relevant considerations, factors, or variables that facilitate the determination of an energy-efficient execution.

Scheduling server 40 may be configured to execute applications 14 in an energy efficient manner explicitly or implicitly. For example, in particular embodiments, client 60 may transmit request 62 that includes an explicit request for an energy-efficient execution. As discussed further below, scheduling server 40 selects a particular datacenter 20 to execute application 14, and may transmit an indication of the selected datacenter 20 and a selected execution time to client 60. Client 60 may then confirm the execution of the requested application 14 at the selected execution time or request an alternative datacenter 20 and/or execution time. In some embodiments, system 10 may be configured to schedule applications 14 in an energy efficient manner, whether or not requested by a particular client 60. As a result, client 60 may simply transmit request 62 that requests execution of application 14, and, as discussed further below, datacenter 20 selects an energy efficient datacenter 20 and/or selects an energy efficient time to execute application 14. Whether explicit or implicit, scheduling server 40 may then determine the most energy-efficient manner of executing the requested application 14.

Scheduling server 40 receives request 62 from client 60, and selects a particular datacenter 20 among a plurality of datacenters 20 at which to execute the requested application 14. Scheduling server 40 may select a particular datacenter 20 based, at least in part, on scheduling policy 55 received from policy server 50, request 62, and datacenter attributes 45.

At appropriate points during operation, scheduling server 40 receives information associated with attributes of each respective datacenter 20. Scheduling server 40 may store attributes associated with each respective datacenter 20 in datacenter attributes 45. As a result, scheduling server 40 may store datacenter attributes 45 associated with each respective datacenter 20. As discussed above, datacenter attributes 45 may indicate one or more of the following:

(1) The percentage utilization of server 30 in a respective datacenter 20. This attribute indicates the most recent and/or historical measure of the amount of resources being utilized by servers 30 in a particular datacenter 20. This attribute may indicate a utilization metric for each server 30 in the particular datacenter 20. In some embodiments, if utilization is near a maximum at a first server 30 in the particular datacenter 20, scheduling server 40 may schedule the execution of application 14 at a second server 30 in the particular datacenter 20, even if execution at the first server 30 is more energy efficient. Thus, scheduling server 40 is able to select a particular server 30 with resources available to execute application 14.

(2) The overall utilization of the particular datacenter 20. This attribute indicates the most recent and/or historical measure of the amount of resources currently being utilized by a particular datacenter 20. Overall utilization may represent an aggregate utilization of all servers 30 housed in datacenter 20. In some embodiments, the overall utilization indicates the percentage of resources used to power server 30 in datacenter 20, as well as resources used to power other components of datacenter 20 (such as, for example, heating or air conditioning equipment, electronic data backups, and/or networking equipment). Thus, scheduling server 40 is able to select a particular datacenter 20 that currently has resources available to execute application 14.

(3) A cooling/heating index of the datacenter 20. This attribute indicates a relative amount of electricity required to heat and/or cool the interior of datacenter 20. Since server 30, and other electrical components of datacenter 20 generate heat, in particular embodiments, cooling will be required to maintain datacenter 20 at an appropriate operating temperature. Additional applications 14 executed at datacenter 20 may raise the ambient temperature of the interior of a particular datacenter 20, thus requiring additional cooling expense. Thus, in some embodiments, scheduling server 40 may execute application 14 in a datacenter 20 with lower heating and/or cooling costs.

(4) Power availability. This attribute indicates an amount of power available to be supplied to datacenter 20. In certain embodiments, the amount of power able to be supplied by a local utility or power provider may be limited. The power supply may be limited by contract, power generation constraints, demand, and/or any other constraint. Moreover, power availability may be measured on a sliding scale. For example, more electricity may be available during off-peak times than during peak demand times.

(5) The optimal usage of renewable energy. This attribute indicates the amount of power supplied to datacenter 20 that originates from renewable sources. Depending on the overall configuration of system 10, it may be preferable to execute application 14 at a particular datacenter 20 that is powered by a certain amount of renewable resources (such as, for example, wind power, solar power, and/or geothermal power). Optimal usage of renewable energy may include a calculation of the overall carbon emissions of a datacenter 20. Thus, scheduling server 40 may execute applications 14 in a comparatively low-carbon-intensity manner.

(6) Power unit price profiling based on the local regulations or provider. This attribute indicates a price paid for electricity supplied to datacenter 20. It may be specified in dollars per kilowatt-hours of electricity, and may vary depending on the particular type of source, whether renewable, or non-renewable, generating the electricity. For example, electricity supplied from a coal-fired power plant may cost $0.10 per kilowatt-hour, while electricity supplied from a wind-powered source may cost $0.18 per kilowatt-hour.

(7) Peak pricing and off-peak pricing information. This attribute indicates a price for electricity during peak demand times and/or during off-peak demand times. For example, electricity supplied to a particular datacenter 20 may cost $0.10 per kilowatt-hour during off-peak times, and $0.20 per hour during peak demand times. Using peak pricing and off-peak pricing information, and to the extent possible, scheduling server 40 may schedule application 14 to execute during the lowest cost time period.

(8) Historical and/or real time climatic factors of the area supporting energy usage. This attribute indicates historical and/or real time information associated with the climate where a particular datacenter 20 is located. In some embodiments, it may be less expensive to executed application 14 at a location where the climate is cold, since cooling would be virtually free. Similarly, at a datacenter 20 that is experiencing a hot day, cooling may be very expensive, and scheduling server 40 may execute application 14 at an alternative datacenter 20 where temperatures are more favorable for energy efficient execution of application 14.

(9) Energy supply availability for a specific time and duration based on local constraints and demand. This attribute indicates an amount of power able to be supplied to a particular datacenter 20 at particular times and for particular durations. In certain embodiments, the amount of power able to be supplied by a local utility or power provider may be limited during particular times of the day, especially during peak-demand periods. Moreover, a particular datacenter 20 may require large amounts of power, depending on the overall size of the relevant datacenter 20 and the types of processing being performed. Such constraints may be beyond the control of an enterprise in which system 10 is operating. Thus, based on expected power utilization of application 14, scheduling server 40 may schedule application 14 at a datacenter 20 where the power required to execute application 14 is available.

Based on information indicated in request 62, scheduling server 40 requests a particular scheduling policy 55 from policy server 50. As discussed above, scheduling policies 55 are used for both the explicit scheduling requests by client 60 as well as implicit scheduling requests by scheduling server 40. In particular embodiments, scheduling policy 55 defines at what time of the day applications 14 can be executed and at what particular datacenters 20 applications 14 can be executed. Scheduling policies 55 may be created by an operator of system 10. As a result, scheduling server 40 may receive an appropriate policy 55 from policy server 50. A particular scheduling policy 55 may define policies for a particular type of application 14. For example, payroll processing may be extremely resource intensive, and last for a few hours. A particular scheduling policy 55 associated with a payroll processing application may state that it should not be run during business hours, that a selected datacenter 20 must have sufficient resources to finish execution of the application within four hours, and that 20% of the energy supplied to execute the payroll processing application comes from renewable sources. Thus, if a user at client 60 transmits request 62 indicating a request to execute a payroll processing application during business hours, the request may be denied. Scheduling server 40 may indicate an alternative time to client 60, which may be confirmed by a user at client 60, or may silently delay execution of the payroll processing application until the policies indicated by scheduling policy 55 can be met. As another example, a particular policy 55 may define policies for a particular low-priority user. Thus, particular scheduling policy 55 associated with this user may indicate that all applications 14 requested by this user will be executed at the lowest-cost datacenter 20 and lowest-cost execution time. Policy server 50 may transmit scheduling policy 55 to scheduling server 40 in response to a request transmitted from scheduling server 40 or at any suitable time.

When a user at client 60 transmits request 62 that indicates an explicit scheduling request to scheduling server 40, the request can be verified from the policy perspective. For example, if the user sends a request to explicitly scheduling a backup job from an energy efficiency perspective and if the most efficient datacenter 20 is in "zone 1", and if a particular scheduling policy 55 indicates not to schedule any backup jobs in the zone 1 during 12 noon to 6 p.m., scheduling server 40 checks if it is acceptable for the user to have the job done in a time frame other than the one specified by the policy engine. If scheduling policy 55 determines that it is acceptable, only then should the job be scheduled appropriately.

For implicit energy-efficiency scheduling, scheduling server 40 can also consult policy server 50 to determine automatically where there is an opportunity to save energy be implicitly moving application execution. In general, it is policy server 50 that governs how efficiency is achieved and maintained and through which datacenters 20.

Based on request 62, datacenter attributes 45 and/or scheduling policy 55, scheduling server 40 selects an appropriate execution time to execute the requested application 14 and a particular datacenter 20 at which to execute application 14. Once selected, scheduling server 40 may execute the application at the selected datacenter 20 at the selected execution time. To execute application 14, scheduling server 40 may install a virtual software environment on a particular server 30. In some embodiments, scheduling server 40 may install a virtual machine on a particular server 30. For example, scheduling server 40 may install an instance of VMWare on a particular server 30 at an appropriate time, including just prior to executing the requested application 14. The installed virtual machine may be uninstalled after the requested application 14 has completed execution. In some embodiments, scheduling server 40 may install a virtual machine on multiple servers 30, thus providing for pooled execution of application 14. Thus, server 30 may be grouped by geographical and/or any other logical grouping that would facilitate setting up and working with policies. In some embodiments, scheduling policy 55 can define an event which causes applications 14 to be execute on a specific server 30 or a group of servers 30, a virtual machine executing on servers 30 and/or a cloud.

By scheduling the execution of applications 14 at an energy-efficient time and at an energy efficient datacenter 20, scheduling server 40 may provide numerous opportunities for energy cost savings and to enhance an enterprise's use of renewable sources. As a result, system 10 allow companies to significantly reduce energy costs and/or reduce the carbon footprint associated with processing computing jobs. Utilizing system 10, enterprises may gain control of resource utilization, and direct application execution according to pre-defined policies. Predetermined and configurable policies allow an enterprise to control their energy usage, weighting such factors as time, carbon footprint, corporate image, cost, profit and revenue generating opportunities, performance, and scalability. Enterprises may change the weights associated with each policy, thus enabling an enterprise to change energy consumption and carbon usage patterns over time. As a result, system 10 may provide numerous operational benefits. Nonetheless, particular embodiments may provide some, none, or all of these operational benefits, and may provide additional operational benefits.

Modifications, additions, or omissions may be made to system 10 without departing from the scope of the present disclosure. For example, when a component of system 10 determines information, the component may determine the information locally or may receive the information from a remote location. As another example, in the illustrated embodiment, servers 30, scheduling server 40, policy server 50, and clients 60 are represented as different components of system 10. However, the functions of servers 30, scheduling server 40, policy server 50, and clients 60 may be performed by any suitable combination of one or more servers or other components at one or more locations. In the embodiment where the various components are servers, the servers may be public or private servers, and each server may be a virtual or physical server. The server may include one or more servers at the same or at remote locations. Also, servers 30, scheduling server 40, policy server 50, and clients 60 may include any suitable component that functions as a server. Additionally, system 10 may include any appropriate number of servers 30, scheduling servers 40, price servers 50, and clients 60. Any suitable logic may perform the functions of system 10 and the components within system 10.

Figure 2:
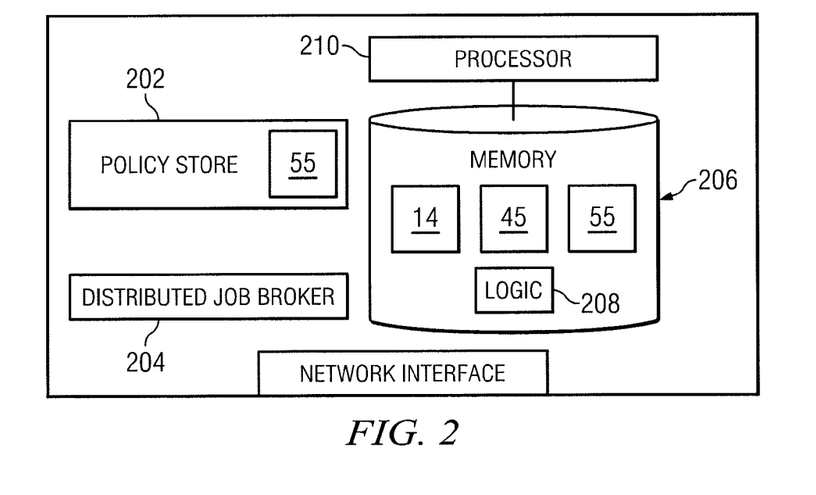
FIG. 2 illustrates the scheduling server illustrated in FIG. 1 in more detail, including aspects of the present disclosure.

FIG. 2 is a block diagram illustrating aspects of the scheduling server 40 discussed above with respect to FIG. 1. As discussed above, scheduling server 40 determines at which of a plurality of datacenters 20 and a time at which to execute application 14 based, at least in part, on datacenter attributes 45, scheduling policy 55, and request 62. Scheduling server 40 includes policy store 202, distributed job broker 204, memory 206, logic 208, processor 210, and network interface 212.

In general, scheduling server 40 comprises any suitable combination of hardware and/or software implemented in one or more modules to provide the described functions and operations. In some embodiments, scheduling server 40 may comprise a general-purpose personal computer (PC), a Macintosh, a workstation, a Unix-based computer, a server computer, or any suitable processing device. In some embodiments, the functions and operations described above may be performed by a pool of multiple scheduling servers 40.

Policy store 202 receives and stores scheduling policy 55 from policy server 50. In particular embodiments, policy server 50 may store one or more scheduling policies 55, depending on the overall needs, capabilities, and/or configuration of system 10. Policy store 202 may request a particular scheduling policy 55 associated with a user, a particular application 14, datacenter 20, and/or an execution time from policy server 50. Distributed job broker 504 retrieves policy store 202 for a particular scheduling policy 55 to facilitate appropriate scheduling of execution of applications 14. Policy store 202 retrieves and/or stores a particular scheduling policy 55 from policy server 50 based on the particular application 14 being executed, the particular datacenter 20 application 14 will be executed at, the time of day requested, the particular user requesting execution of application 14, and/or any other relevant considerations, factors, and/or variables. Once distributed job broker 204 has scheduled execution of a particular application 14, policy store 202 may delete, erase, or otherwise remove scheduling policy 55.

Distributed job broker 204 selects an appropriate datacenter 20 from among a plurality of datacenters 20 to execute a requested application 14 based, at least in part, on scheduling policy 55, request 62, and/or datacenter attributes 45. Distributed job broker 204 receives scheduling policy 55 from policy store 202. Distributed job broker 204 receives datacenter attributes 45 user input, from servers 30 located in datacenter 20, and/or from any other suitable component of system 10. As discussed above, datacenter attributes 45 indicate one or more characteristics, aspects, and/or variables associated with one or more datacenters 20. Based on scheduling policy 55, request 62, and/or datacenter attributes 45, distributed job broker 204 selects an appropriate datacenter 20 to execute application 14 and an appropriate time to execute application 14. In particular embodiments, the selected execution time may be different from a time indicated in request 62. Thus, distributed job broker 204 transmits to a requesting client 60 an alternative time for executing application 14 than the one indicated in request 62. In some embodiments, distributed job broker 204 may select a particular server 30 and/or a plurality of servers 30 to execute application 14. In other embodiments, distributed job broker 204 may select an appropriate datacenter 20 to execute application 14, and datacenter 20 selects an appropriate server 30 to execute application 14. Once selected, distributed job broker 204 may execute the application at the selected datacenter 20 and/or selected server 30 at the selected execution time. To execute application 14, distributed job broker 204 may install a virtual software environment on a particular server 30. In some embodiments, scheduling server 40 may install a virtual machine on a particular server 30. For example, distributed job broker 204 may install an instance of VMWare on a particular server 30 at an appropriate time, including just prior to executing the requested application 14. The installed virtual machine may be uninstalled after the requested application 14 has completed execution. In some embodiments, distributed job broker 204 may install a virtual machine on multiple servers 30, thus providing for pooled execution of application 14. In general, however, distributed job broker 204 may execute application 14 at the selected datacenter 20 and/or selected server 30 in any appropriate manner.

Memory 206 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information. Although FIG. 2 illustrates memory 206 as internal to scheduling server 40, it should be understood that memory 206 may be internal or external to scheduling server 40, depending on particular implementations. Memory 206 may be separate from or integral to other memory devices to achieve any suitable arrangement of memory devices for use in system 10.

Memory 206 is generally operable to store request 62, datacenter attributes 45, scheduling policy 55 and/or any other information associated with datacenters 20, servers 30, and/or applications 14. Memory 206 is further operable to store logic 208.

Processor 210 is coupled to memory 206 and is generally operable to execute logic 208 to receive request 62, scheduling policies 55, datacenter attributes 45, and, based, at least in part, on request 62, scheduling policy 55, and/or datacenter attributes 45, select a particular datacenter 20 to execute application 14 and an appropriate execution time. Processor 210 comprises any suitable combination of hardware and software implemented in one or more modules to provide the described function or operation.

Network interface 212 communicates information relevant to scheduling and/or executing applications 14 at datacenters 20. For example, network interface 212 receives scheduling policy 55 from policy server 50 and request 62 from client 60 through network 70. Network interface 212 represents any port or connection, real or virtual, including any suitable hardware and/or software that allows scheduling server 40 to exchange information with network 70, datacenters 20, policy server 50, clients 60 and/or or other components of system 10.

Figure 3:
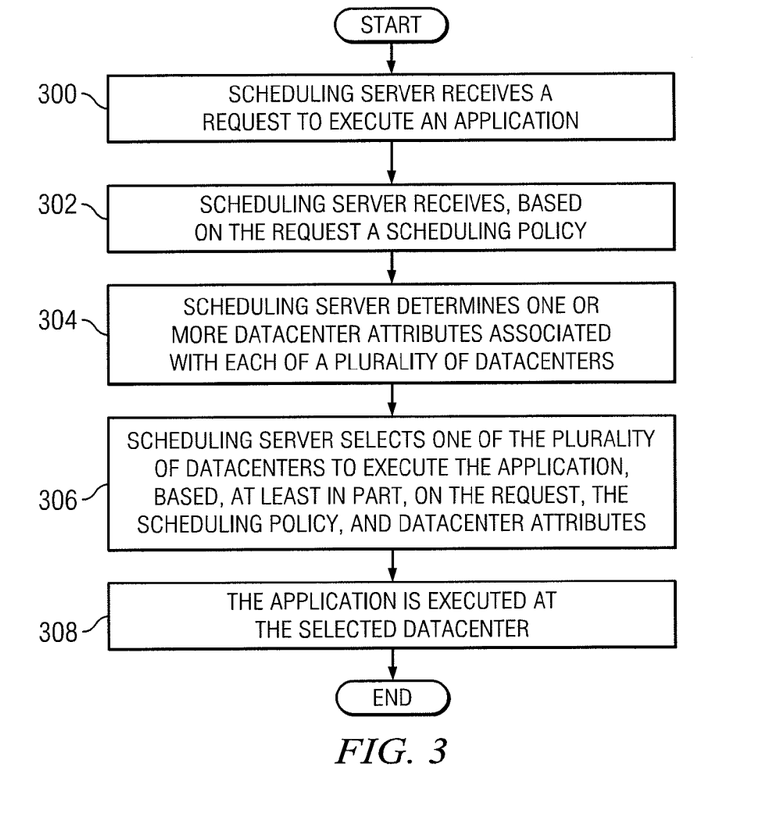
FIG. 3 is a flow chart illustrating a particular operation of the system of FIG. 1 in accordance with particular embodiments of the present disclosure.

FIG. 3 is a flow diagram illustrating an operation in accordance with a particular embodiment of system 10. In the illustrated example, operation begins at step 300, with scheduling server 40 receiving request 62 from client 60 to execute application 14. In some embodiments, request 62 includes information indicating the type of application 14 requested, an amount of memory and/or CPU processing power required by application 14, an amount of data that will be used during the execution application 14, a preferred and/or mandatory time at which the application 14 should be executed, and/or any other relevant considerations, factors, or variables that facilitate energy efficient execution of application 14.

At step 302, scheduling server 40 receives scheduling policy 55 from policy server 50. As discussed above, based on information indicated in request 62, scheduling server 40 requests a particular scheduling policy 55 from policy server 50. As a result, scheduling server 40 may receive an appropriate policy 55 from policy server 50 to determine an appropriate datacenter 20 and time to execute application 14. A particular scheduling policy 55 may define policies for a particular type of application 14. Policy server 50 may transmit scheduling policy 55 to scheduling server 40 in response to a request transmitted from scheduling server 40 or at any suitable time.

At step 304, scheduling server 40 determines one or more datacenter attributes 45 associated with each of a plurality of datacenters 20. In particular embodiments, scheduling server 40 retrieves a particular datacenter 20 from a list of datacenters 20 stored in memory 206. Scheduling server 40 additionally or alternatively retrieves datacenter attributes 45 associated with the selected datacenter 20 stored in memory 206. For each datacenter 20, datacenter attributes 45 may indicate one or more of (1) the percentage utilization of servers 30; (2) the overall utilization of the particular datacenter 20; (3) a cooling/heating index of datacenter 20; (4) power availability; (5) the optimal usage of renewable energy for operations as well as heating and/or cooling of datacenter 20; (6) power unit price profiling based on the local regulations or provider; (7) peak pricing and off-peak pricing information; (8) historical and/or real time climatic factors of the area supporting energy usage; (9) energy supply availability for a specific time and duration based on local constraints and demand. Particular datacenter attributes 45 may indicate any number and/or combination of the foregoing attributes, and may indicate additional attributes.

At step 306 scheduling server 40 selects one of the plurality of datacenters 20 to execute the application, based, at least in part, on request 62, scheduling policy 55, and datacenter attributes 45. For example, request 62 may include a request for a data backup application to be run for 3 hours. A particular scheduling policy 55 associated with a data backup application may indicate that it should not be run during business hours, that a selected datacenter 20 must have sufficient resources to finish execution of the application within four hours, and that 10% of the energy supplied to execute the payroll processing application comes from renewable sources. Thus, if a user at client 60 transmits request 62 indicating a request to execute a data backup application during business hours, the request may be denied. Scheduling server 40 may indicate an alternative time to client 60, which may be confirmed by a user at client 60, or may silently delay execution of the data backup application until the data backup application can be executed without violating the policies indicated by scheduling policy 55. If request 62 indicates a request to execute a data backup application after business hours, scheduling server 40 may select an appropriate datacenter 20 that satisfies the policies indicated in scheduling policy 55. Thus, scheduling server 40 selects a particular datacenter 20 that has sufficient resources to finish execution within four hours, and that has 10% of its electricity supplied by renewable sources.

At step 308, application 14 is executed at the selected datacenter 20. In particular embodiments, scheduling server 40 may execute application 14 at the selected datacenter 20 at an appropriate execution time. To execute application 14, scheduling server 40 may install a virtual software environment on a particular server 30. In some embodiments, scheduling server 40 may install a virtual machine on a particular server 30. For example, scheduling server 40 may install an instance of VMWare on a particular server 30 at an appropriate time, including just prior to executing the requested application 14. The installed virtual machine may be uninstalled after the requested application 14 has completed execution. In general however, scheduling server 40 may execute application 14 at the selected datacenter 20 and/or on the selected server 30 in any appropriate manner. In some embodiments, scheduling server 40 may install a virtual machine on multiple servers 30, thus providing for pooled execution of application 14. Thus, server 30 may be grouped by geographical and/or any other logical grouping that would facilitate setting up and working with policies. In some embodiments, scheduling policy 55 can define an event which causes applications 14 to be executed on a specific server 30 or a group of servers 30, a virtual machine executing on servers 30 and/or a cloud.

The steps illustrated in FIG. 3 may be combined, modified, or deleted where appropriate, and additional steps may also be added to those shown. Additionally, the steps may be performed in any suitable order without departing from the scope of the present disclosure.

Although the present disclosure has been described with several embodiments, numerous changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method comprising:
   receiving, with a processor, a request for execution of an application;
   receiving, with the processor, weights associated with a plurality of energy usage factors;
   determining based on the request and the weights associated with the plurality of energy usage factors, a scheduling policy;
   for each of a plurlity of datacenters, determining one or more datacenter attributes associated with each respective datacenter;
   selecting one of the plurality of datacenters to execute the application based, at least in part, on the request, the scheduling policy, and the datacenter attributes;
   executing the application at the selected datacenter; and
   wherein the plurality of energy usage factors include the carbon footprint, corporate image, cost, and revenue generating opportunities.

2. The method of claim 1, further comprising selecting a time, based at least in part on the scheduling policy, the request, and the one or more datacenter attributes, to execute the application; and
   wherein executing the application at the selected datacenter comprises executing the application at the selected datacenter at the selected time.

3. The method of claim 1, wherein the one or more datacenter attributes comprise the percentage utilization of servers in the respective datacenter.

4. The method of claim 1, wherein the one or more datacenter attributes comprise a cooling index of the respective datacenter.

5. The method of claim 1, wherein the one or more datacenter attributes comprise an amount of renewable electricity powering the respective datacenter.

6. The method of claim 1, wherein the one or more datacenter attributes comprise climatic information associated with an environment in which the respective datacenter is located.

7. The method of claim 1, wherein executing the application at the selected datacenter comprises:
   installing a virtual machine on a server at the selected datacenter;
   executing the application on the virtual machine installed on the server; and
   removing the virtual machine from the server at the selected datacenter.

8. A system comprising:
   a plurality of datacenters, wherein each of the respective datacenter is associated with one or more datacenter attributes;
   a scheduling server operable to:
      receive a request for execution of an application;
      receive, based on the request, a scheduling policy; and
      select one of the plurality of datacenters to execute the application based, at least in part, on the request, the scheduling policy, and the datacenter attributes;
   a policy server operable to:
      receive weights associated with a plurality of energy usage factors;
      determine, based on the request and the weights associated with the plurality of energy usage factors, the scheduling policy; and
      transmit the scheduling policy to the scheduling server;
   a server located at the selected datacenter, wherein the server is operable to execute the application; and
   wherein the plurality of energy usage factors include the carbon footprint, corporate image, cost, and revenue generating opportunities.

9. The system of claim 8, wherein the scheduling server is further operable to select a time, based at least in part on the scheduling policy, the request, and the one or more datacenter attributes, to execute the application; and
   wherein the server is operable to execute the application by executing the application at the selected time.

10. The system of claim 8, wherein the one or more datacenter attributes comprise the percentage utilization of servers in the respective datacenter.

11. The system of claim 8, wherein the one or more datacenter attributes comprise a cooling index of the respective datacenter.

12. The system of claim 8, wherein the one or more datacenter attributes comprise an amount of renewable electricity powering the respective datacenter.

13. The system of claim 8, wherein the one or more datacenter attributes comprise climatic information associated with an environment in which the respective datacenter is located.

14. The system of claim 8, wherein the scheduling server is further operable to:
   install a virtual machine on the server located at the selected datacenter;
   remove the virtual machine from the server; and
   wherein the server located at the selected datacenter is operable to execute the application by executing the application on the virtual machine installed on the server.

15. A computer readable non-transitory medium encoded with logic, the logic operable, when executed on a processor to:
   receive a request for execution of an application;

receive weights associated with a plurality of energy usage factors;

determine, based on the request and weights associated with the plurality of energy usage factors, a scheduling policy;

for each of a plurality of datacenters, determine one or more datacenter attributes associated with each respective datacenter;

select one of the plurality of datacenters to execute the application based, at least in part, on the request, the scheduling policy, and the datacenter attributes;

execute the application at the selected datacenter; and wherein the plurality of energy usage factors include the carbon footprint, corporate image, cost, and revenue generating opportunities.

16. The computer readable non-transitory medium of claim 15, wherein the logic is further operable to:

select a time, based at least in part on the scheduling policy, the request, and the one or more datacenter attributes, to execute the application; and execute the application by executing the application at the selected time.

17. The computer readable non-transitory medium of claim 15, wherein the datacenter attributes comprise the percentage utilization of servers in the respective datacenter.

18. The computer readable non-transitory medium of claim 15, wherein the datacenter attributes comprise a cooling index of the respective datacenter.

19. The computer readable non-transitory medium of claim 15, wherein the one or more datacenter attributes comprise an amount of renewable electricity powering the respective datacenter.

20. The computer readable non-transitory medium of claim 15, wherein the one or more datacenter attributes comprise climatic information associated with an environment in which the respective datacenter is located.

21. The computer readable non-transitory medium of claim 15, wherein the logic is further operable to:

install a virtual machine on the server located at the selected datacenter;

execute the application by executing the application on the virtual machine installed on the server; and remove the virtual machine from the server.

22. A system comprising:

means for receiving, with a processor, a request for execution of an application;

means for receiving, with a processor, weights associated with a plurality of energy usage factors;

means for determining, based on the request and the weights associated with the plurality of energy usage factors, a scheduling policy;

means for determining, for each of a plurality of datacenters, one or more datacenter attributes associated with each respective datacenter, wherein the one or more datacenter attributes comprise;

means for selecting one of the plurality of datacenters to execute the application based, at least in part, on the request, the scheduling policy, and the datacenter attributes;

means for executing the application at the selected datacenter; and wherein the plurality of energy usage factors include the carbon footprint, corporate image, cost, and revenue generating opportunities.

* * * * *